Figure 1:
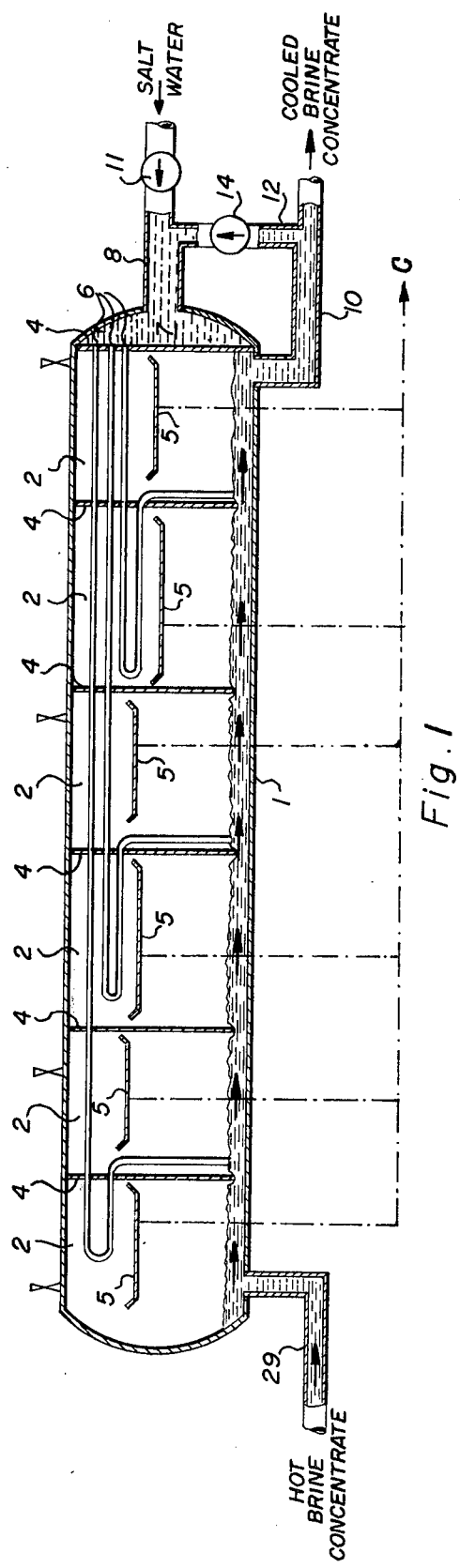

United States Patent [19]

Margen

[11] 4,004,984
[45] Jan. 25, 1977

[54] DISTILLATION PLANT

[75] Inventor: Peter Heinrich Erwin Margen, Nykoping, Sweden

[73] Assignee: Aktiebolaget Atomenergi, Stockholm, Sweden

[22] Filed: Feb. 7, 1975

[21] Appl. No.: 548,098

[52] U.S. Cl. .............................. 202/173; 202/174; 159/2 MS; 159/17 R

[51] Int. Cl.² ...................... B01D 1/28; B01D 3/02; B01D 1/26

[58] Field of Search .......... 202/173, 174; 165/159; 159/28 R, 2 MS, DIG. 15, DIG. 8

[56] References Cited

UNITED STATES PATENTS

| | | | |
|---|---|---|---|
| 3,050,786 | 8/1962 | St. John et al. | 159/28 R |
| 3,174,914 | 3/1965 | Worthen et al. | 202/173 |
| 3,192,131 | 6/1965 | Loebel et al. | 202/173 |
| 3,344,041 | 9/1967 | Wulfson | 202/173 |
| 3,372,096 | 3/1968 | Tidball | 202/173 |
| 3,515,645 | 6/1970 | Wetch | 202/173 |
| 3,527,676 | 9/1970 | Hingst et al. | 203/11 |
| 3,605,883 | 9/1971 | Nalbone | 202/173 |
| 3,632,481 | 1/1972 | Hammond et al. | 203/11 |
| 3,734,835 | 5/1973 | Specacci | 202/173 |
| 3,735,808 | 5/1973 | Barba et al. | 202/173 |
| 3,770,592 | 10/1973 | Noirot | 159/DIG. 15 |

FOREIGN PATENTS OR APPLICATIONS

| | | | |
|---|---|---|---|
| 236,076 | 6/1911 | Germany | 159/2 MS |

*Primary Examiner*—Jack Sofer
*Attorney, Agent, or Firm*—Toren, McGeady and Stanger

[57] ABSTRACT

There is provided a distillation plant of the multiple stage flash distillation type. The plant comprises a reinforced concrete shell which is divided into a large number of flash chambers and a heat supply chamber by means of separation walls. At least some of a bundle of continuous condensation tubes of plastic extend throughout all of the chambers. The tubes may be extruded in situ so that they directly move into position in the shell. The inlet and outlet manifolds for the tube bundle are defined by an end of the shell and an adjacent separation wall. The shell has preferably a plastic coating or consists of a polymer concrete. Preferably, the walls consist of or comprise plastic so that the bundle of plastic tubes may be sealed to apertures in the walls by gluing or welding.

6 Claims, 2 Drawing Figures

DISTILLATION PLANT

The present invention refers to a distillation plant comprising a heat supply chamber, several serially arranged vaporizing chambers of sub-pressure type, said vaporizing chambers being arranged in a common shell, and being defined by said shell and partitions, a bundle of condensation tubes, of which at least some extend through all the vaporizing chambers, cold distill and flowing through said tubes, a basin in each vaporizing chamber, through which basin heated distill and flows, and a condensate trough in each vaporizing chamber, said trough being positioned under the tubes, for gathering of the distillate.

In desalination plants of the MSF-type (Multiple Stage Flash Distillation) large amounts of tubes of a metal, which is corrosion resistant, are required. Metals which can stand the actual water contaminants and corrosion attacks are under development, but hitherto it has not been possible to find suitable materials of reasonable costs. In known plants of the indicated type, there are also difficulties concerning the sealing between the tubes and the manifolds for the vaporizing chambers, and further to this, the manufacturing costs for these manifolds are high. Suitable metals for the tubes have such dilatation properties that the tubes must be fitted with a sliding seal or be designed as slings in each vaporizing chamber, in order to avoid excessive stresses and the risk for leakage due to failure in the tubes and the seals.

The present invention offers a solution to said disadvantages and will also provide solutions to other problems occurring in known plants of the indicated type.

The characterizing features of the invention are that the condensation tubes extend also through the heat supply chamber and consist of plastic, and that the heat supply chamber is positioned within the shell and is defined by the shell and at least one partition. The tubes may be pulled through prefabricated apertures in the partitions of the chambers. Said partitions may consist of plastic and the tubes may be sealed to the partitions by means of for example gluing or welding. The open spaces between the separate tubes of the tube bundle are eliminated at the positions which are intended to lie at the separation walls and the outer parts of the bundle are sealed to the walls by means of gluing or welding. The spaces between the tubes of the bundle may be eliminated by pressing together the bundle of tubes while locally heating the bundle in the pressing area, so that the outer surfaces of the tubes are welded to each other. Alternatively the spaces between the tubes of the bundle may be eliminated by applying a sealing agent between the tubes. In one embodiment, the apertures of the partitions for the tube bundles are provided with bowls, which together with the part of the wall, that is positioned above the aperture, constitute water locks, which are filled with water, so that the tube bundle easily may be pulled through said water locks and so that said water locks seal the chambers from each other. Said bowl may be filled with condensate water from a condensate trough. The bowl may be arranged to permit an overflow of condensate water from a chamber of high pressure to the condensate trough in the adjacent chamber of lower pressure.

Very low volumetric costs for thin wall tubes of plastic, for example polyvinylchloride, PVC or polyethylene PE (said costs being only a few percent of those for metal tubes) makes it possible to economically utilize plastic tubes in desalination plants, especially of the MSF-type, which require large tube areas, if the operation temperatures are limited to those, which cheap polymers can stand. If the plant is operated at a temperature in the range of 50°–25° C, it is possible to utilize tubes of PVC, which have a high coefficient of thermal conductivity, or PEH, the advantage with PVC being that it has a better strength and may be glued. At higher temperatures, 90°–50° C, post chlorinated PVC or cross linked polyethylene can be utilized, and this leads only to a moderate rise in material costs. For plants with a temperature range of 90°–25° C, said types of materials may be used in separate parts of the plant. Similarly metal tubes may also be utilized in the heating chamber, for example. The drawback with the low thermal conductivity of the plastic in comparison with that of metal can easily be reduced by increasing the number of plastic tubes, while the tubes are made with a smaller diameter than is usual for tubes in plants using metal tubes, and due to the low costs for the plastic material, it is possible to increase the total tube surface in each chamber by increasing the number of tubes therein without substantially raising the costs.

The vaporizing chambers may according to the invention be defined by means of a shell, which is common for the chambers and which may consist of plastic coated concrete or polymer concrete, for example, said shell being divided into chambers by means of separation walls, which advantageously may be made of plastic concrete or plastic coated concrete or only of a relatively thin plastic board, preferably of the same type of material as that of the tubes, as the separation walls only have to take up those loads, which refer to the pressure differential between adjacent chambers.

The plant according to the invention has further the advantage that the plastic tubes readily may be moved through and sealed to the separation walls. Alternately, a water lock can be provided in the separation wall with the plastic tubes passing through the water lock so that a seal is provided between adjacent chambers. Further to this the tubes may readily be made in situ and directly after extrusion be moved in through the chambers, whereafter the tubes are sealed to the separation walls or their coatings.

According to the invention the seal between the chambers may be obtained by arranging separate apertures in the partition for every single tube, and by gluing or welding or moulding each tube at the opening. Another way of arranging the seal is to pull the bundle of tubes through a single aperture in the partition and to seal the spaces between the tubes of the bundle by locally compressing the bundle by heating the bundle in that area, so that the tubes are welded together, or by locally applying a sealing composition between the separate tubes of the bundle, whereafter the sealed tube bundle is sealed to the opening in the separation wall, as described above.

Figure 2:
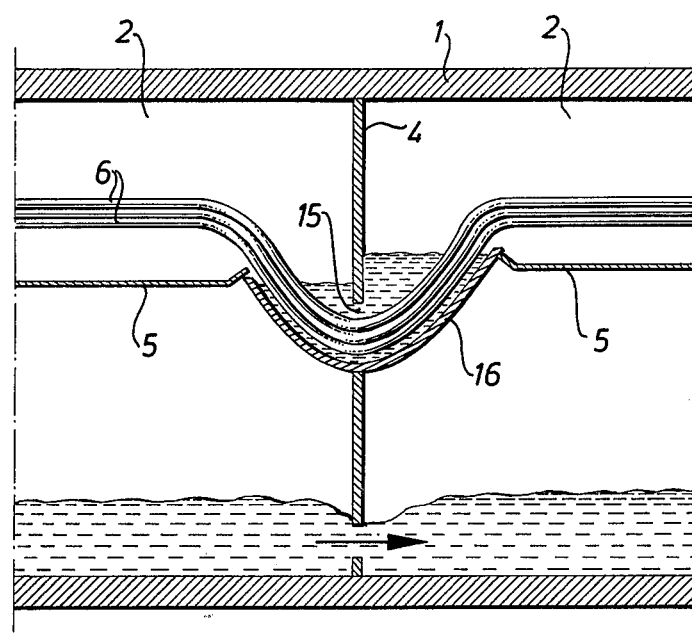

In the following the invention will be more closely described with reference to the enclosed drawings, in which FIG. 1 shows a longitudinal section through a plant according to the invention, and FIG. 2 shows a sealing arrangement at a partition between the vaporizing chambers of the plant and a tube bundle.

FIG. 2 shows a partition or separation wall 4 between two chambers 2, which are surrounded by a shell 1. A condensate trough 5 is arranged under a tube bundle 6 in each chamber 2. An aperture 15 for the tube bundle 6 in the separation wall 4 is provided with a bowl 16, which is filled with condensate and which together with the separation wall constitutes a water lock, through which the tube bundle 6 extends. The water lock seals the chambers from each other. The bowl 16 is filled with condensate water from the trough 5 for the tube bundle 6 in the adjacent chamber of higher pressure. The water surface of the water lock will be positioned at different heights at opposite sides of the wall 4, due to the pressure differential between the flash chambers or vaporizing chambers 2. The position of the edge of bowl 16 in the chamber of lower pressure should preferably be adapted so that the condensate flows over the edge of the bowl and down into the trough 5, so that the water of the water lock is changed continuously.

It should be appreciated that the plant according to the invention may well be utilized for distillation of any liquid, and that the specific reference to salt water distillation is made for description purposes only.

The plant illustrated in FIG. 1 may comprise a large number of vaporizing chambers (more than 10). The sub-pressure in the vaporizing chambers may be obtained by throttling the brine flow between adjacent chambers, or by vacuum pumps, and/or by air ejectors, which may be used to take care of the air content of the water.

At least part of the sub-pressure may be achieved by arranging the outlet and inlet for salt water at different levels, so as to obtain a siphon effect.

The condensate troughs 5 may be connected to each other (via the bowls 16, for example, c.f. FIG. 2) so that condensate C need be collected from the rightmost chamber 2 only (in FIG. 1).

In FIGS. 1 and 2, equal reference numerals denote corresponding parts.

In the plant according to FIG. 1, salt water is fed by pump 11 through inlet conduit 8, manifold 7 and the tubes 6. Hot brine is fed into certain of the chambers 2. As shown, the tubes are divided into three groups. The first group extends through the two rightmost flash chambers 2 and are arranged to terminate in the right chamber of said two chambers. Similarly the second group of tubes extends through the first four flash chambers, but are arranged to terminate into the third chamber. Again, the third group of tubes extends through all of the chambers 2, and terminates in the fifth flash chamber 2. Each of the three groups of tubes and the hot brine supply conduit 29 feeds the same flow.

As an example, with reference to FIG. 1, the salt water can have a temperature of 8° C. This salt water is mixed with recirculated brine from duct 10 by means of duct 12 containing valve 14, so as to obtain a temperature of 9° C. This mixture is preheated 4° C in each chamber 2.

The hot brine supply can have a temperature of 40° C. The hot brine is cooled 4° C in each chamber, 2 due to evaporation. The preheated brine is fed into the chambers of suitable temperature. Thus, the brine in the third group of tubes is preheated to 33° C and is fed into the fifth chamber 2, wherein the supplied hot brine has been cooled down to 32° C.

In the plant according to FIG. 1, air ejectors are needed only in those chambers, where air-contained in the hot brine from conduit 29 or from the groups of tubes 6 is supplied.

The number of chambers in the plant according to FIG. 1 can of course be much larger, and FIG. 1 is intended to illustrate the construction principle only.

Air ejectors and equipment for arranging various pressures in the flash chambers have been omitted in the drawings, since they are conventional elements, the use of which is obvious to those skilled in the art.

What is claimed is:

1. Distillation plant comprising an axially elongated tubular shaped shell, a plurality of generally vertically positioned horizontally spaced partitions extending transversely of the axis of said shell and dividing the interior of said shell into a plurality of serially arranged vaporizing chambers, a bundle of condenstion tubes extending through said vaporizing chambers and passing through said partitions between adjacent said vaporizing chambers, at least one of said partitions having an opening therethrough with said tube bundle passing through said opening, a bowl positioned in the opening in said partition and extending outwardly therefrom into each of the adjacent said chambers with the upper edge of said bowl located at least above the uppermost point of the opening through said partition, said tube bundle extending through and dipping into said bowl on both sides of said partition, and said bowl arranged to receive distillate to a level above the uppermost point of the opening in said partition so that a water lock is formed within said bowl for sealing the adjacent said chambers from one another.

2. Distillation plant, as set forth in claim 1, wherein a condensate trough is positioned within at least one of said chambers and is arranged to collect distillate, said trough having an overflow located above the upper edge of said bowl and arranged to flow distillate from said trough into said bowl.

3. Distillation plant, as set forth in claim 1, wherein said chamber on one side of the opening through said partition is arranged to operate at a higher pressure than said chamber on the other side of the opening through said partition, a trough in said chamber operating at the lower pressure with said trough arranged to receive water flowing over the upper edge of said bowl under the action of the differential pressure between the two adjacent said chambers.

4. Distillation plant, as set forth in claim 1, wherein the tubes of said bundle are formed of a plastic material.

5. Distillation plant, as set forth in claim 4, wherein the tubes of said bundle passing through said bowl are disposed in spaced relation to the edge of the opening through said partition.

6. Distillation plant, as set forth in claim 4, wherein said partitions are formed of a plastics material.

* * * * *